United States Patent
Vanmaele et al.

(10) Patent No.: US 8,142,860 B2
(45) Date of Patent: Mar. 27, 2012

(54) 3D-INKJET PRINTING METHODS

(75) Inventors: Luc Vanmaele, Lochristi (BE); Eddie Daems, Herentals (BE); Frank De Voeght, Heist op den Berg (BE); Etienne Van Thillo, Essen (BE)

(73) Assignee: Agfa Graphics NV, Mortsel (BE)

( * ) Notice: Subject to any disclaimer, the term of this patent is extended or adjusted under 35 U.S.C. 154(b) by 214 days.

(21) Appl. No.: 12/518,331

(22) PCT Filed: Dec. 19, 2007

(86) PCT No.: PCT/EP2007/064161
§ 371 (c)(1),
(2), (4) Date: Jun. 9, 2009

(87) PCT Pub. No.: WO2008/077850
PCT Pub. Date: Jul. 3, 2008

(65) Prior Publication Data
US 2010/0007692 A1     Jan. 14, 2010

Related U.S. Application Data

(60) Provisional application No. 60/885,493, filed on Jan. 18, 2007, provisional application No. 60/885,498, filed on Jan. 18, 2007.

(30) Foreign Application Priority Data

Dec. 21, 2006   (EP) ..................................... 06126887
Dec. 21, 2006   (EP) ..................................... 06126903

(51) Int. Cl.
*C08J 3/28*      (2006.01)

(52) U.S. Cl. ....................................................... 427/514
(58) Field of Classification Search ....................... None
See application file for complete search history.

(56) References Cited

U.S. PATENT DOCUMENTS

| 3,798,035 | A | * | 3/1974 | Varga et al. | ................... 430/306 |
| 5,387,380 | A | | 2/1995 | Cima et al. | |
| 6,036,777 | A | | 3/2000 | Sachs | |
| 6,464,336 | B1 | | 10/2002 | Sharma | |

(Continued)

FOREIGN PATENT DOCUMENTS

EP      1 428 666 A1     6/2004

(Continued)

OTHER PUBLICATIONS

Official Communication issued in International Patent Application No. PCT/EP2007/064161, mailed on Jul. 17, 2008.

(Continued)

*Primary Examiner* — Matthew Luu
*Assistant Examiner* — Alejandro Valencia
(74) *Attorney, Agent, or Firm* — Keating & Bennett, LLP (57) ABSTRACT

A 3D-inkjet printing method includes the steps of
a) providing two or more fluids having a different composition to an inkjet printer;
b) mixing the two or more fluids in a controlled amount;
c) jetting the mixture of the two or more fluids with the inkjet printer onto a support;
d) at least partially curing the jetted mixture by actinic radiation or electron beam; and
e) repeating steps b) to d) in order to build a 3D-relief on the support. The method is capable of printing 3D-objects with inkjet fluid sets in an inkjet printer.

16 Claims, 3 Drawing Sheets

U.S. PATENT DOCUMENTS

| | | |
|---|---|---|
| 6,550,892 B1 | 4/2003 | Sharma |
| 2005/0040564 A1* | 2/2005 | Oliver et al. .................. 264/494 |
| 2005/0057630 A1* | 3/2005 | Hiroki et al. .................. 347/100 |
| 2006/0055761 A1 | 3/2006 | Daems et al. |

FOREIGN PATENT DOCUMENTS

| | | |
|---|---|---|
| EP | 1 437 882 A1 | 7/2004 |
| EP | 1 449 648 A2 | 8/2004 |
| WO | 01/34371 A2 | 5/2001 |
| WO | 03/016067 A2 | 2/2003 |
| WO | 2004/063295 A1 | 7/2004 |
| WO | 2004/096514 A2 | 11/2004 |

OTHER PUBLICATIONS

Van Thillo et al.: "Inkjet Printing Methods and Ink Sets"; U.S. Appl. No. 12/518,328, filed Jun. 9, 2009.

Van Thillo et al.: "White Inkjet Ink Improved for Dispersion Stability"; U.S. Appl. No. 12/518,340, filed Jun. 9, 2009.

De Voeght et al.: "Inkjet Printing Methods and Inkjet Ink Sets"; U.S. Appl. No. 12/518,338, filed Jun. 9, 2009.

* cited by examiner

3D-INKJET PRINTING METHODS

CROSS-REFERENCE TO RELATED APPLICATIONS

This application is a 371 National Stage Application of PCT/EP2007/064161, filed Dec. 19, 2007. This application claims the benefit of U.S. Provisional Application Nos. 60/885,493, filed Jan. 18, 2007 and 60/885,498, filed Jan. 18, 2007, which are incorporated by reference herein in their entirety. In addition, this application claims the benefit of European Application Nos. 06126887.6, filed Dec. 21, 2006 and 06126903.1, filed Dec. 21, 2006, which are also incorporated by reference herein in their entirety.

BACKGROUND OF THE INVENTION

1. Field of the Invention

The present invention relates to 3D-inkjet printing methods and suitable inkjet fluid sets. More specifically the present invention relates to the making of 3D-objects and flexographic printing forms.

2. Description of the Related Art

In inkjet printing, tiny drops of ink or fluid are projected directly onto a receiver surface without physical contact between the printing device and the ink-receiver. The printing device stores the printing data electronically and controls a mechanism for ejecting the drops image-wise. Printing is accomplished by moving a print head across the ink-receiver or vice versa or both.

Flexography is commonly used for high-volume runs of printing on a variety of supports such as paper, paperboard stock, corrugated board, films, foils and laminates. Packaging foils and grocery bags are prominent examples. Flexographic printing forms are today also made by digital imaging, which includes not only laser recording on flexographic printing form precursors, but also inkjet printing as disclosed, for example, in EP 1449648 A (KPG), EP 1428666 A (AGFA) and US 2006055761 (AGFA).

Three-dimensional inkjet printing is a relatively speedy and flexible printing method for the production of prototype parts, tooling and rapid manufacturing of three-dimensional complex structures directly from a CAD file.

Radiation curable compositions for use in three-dimensional printing methods of complex structures are disclosed by WO 2004/096514 (OBJET GEOMETRIES).

U.S. Pat. No. 5,387,380 (MIT) and U.S. Pat. No. 6,036,777 (MIT) disclose methods for forming three-dimensional images, to be used in "rapid prototyping", wherein the method includes the steps of (i) depositing a first layer of a powder material in a confined region, (ii) depositing a binder material to selected regions of the layer of powder material to produce a layer of bonded powder material at selected regions, (iii) repeating steps (i) and (ii) a selected number of times to produce successive layers of selected regions of bonded powder so as to form the desired prototype. The unbounded powder material is then removed.

Three-dimensional objects have been made which exhibit different colours, but usually all 3D-objects have uniform physical properties for, e.g., hardness or elasticity. In EP A (AGFA) advantages are high-lighted for preparing flexographic printing plates by printing two materials with different elasticity or hardness on a receiving layer. However, problems, such as insufficient adhesion and defects in image quality, can be observed in changing from a "soft, elastic" inkjet ink to a "hard, inelastic" inkjet ink or vice versa. A compromise can then usually be found in changing, for example, the "soft, elastic" inkjet ink to a harder and less elastic inkjet ink, but resulting in the fact that the maximal soft and elastic properties are not attained.

A change in hardness of the top layer of a flexographic printing plate is generally desirable for obtaining a good printing quality when a change in the type of support to be printed upon occurs. One way to approach this is to develop and replace the inkjet fluid or ink used in the printer and print head by a more appropriate inkjet fluid or ink. However, changing of inkjet fluid or ink tends to be very time consuming and is not really a viable solution for an industrial printing environment.

It would be desirable to be able to prepare three-dimensional objects and flexographic printing forms wherein the physical properties, such as flexibility, hardness and elongation at break, can be easily altered without causing problems of adhesion and image quality or without a time-consuming replacement of an inkjet fluid or ink.

SUMMARY OF THE INVENTION

In order to overcome the problems described above, preferred embodiments of the present invention provide 3D-inkjet printing methods wherein physical properties of three-dimensional objects and flexographic printing forms can be altered without causing problems of adhesion.

Preferred embodiments of the present invention provide 3D-inkjet printing methods wherein physical properties of three-dimensional objects and flexographic printing forms can be altered without a time-consuming replacement of an inkjet fluid or ink.

Further advantages and benefits of the present invention will become apparent from the description hereinafter.

It was discovered that the physical properties of three-dimensional objects and flexographic printing forms could be adapted by the mixing of inkjet fluids of different composition just prior to jetting, thereby avoiding the use of a set containing many inkjet fluids encompassing a range of different physical properties after curing. The gradual or stepwise change in composition from a soft, elastic cured material to a hard, less elastic or inelastic cured material resulted in an improvement of the adhesion between layers.

Advantages and benefits of a preferred embodiment of the present invention are realized with a 3D-inkjet printing method described below.

Advantages and benefits of a preferred embodiment of the present invention are realized with a printed 3D-object described below.

Advantages and benefits of a preferred embodiment of the present invention are realized with an inkjet fluid set described below.

Advantages and benefits of a preferred embodiment of the present invention are realized with an inkjet printer described below.

The mixing of fluids of different composition can be advantageously exploited for many purposes in 3D-inkjet printing which may relate to image quality, e.g., dotsize, gloss, line quality and bleeding; physical properties of the ink, e.g., viscosity, temperature, shelf-life stability, surface tension, drying time, curing speed, adhesion to a support, flexibility, resilience, elasticity, elongation at break, creep recovery and hardness of a cured layer; and jetting performance of the printer, e.g., latency, pooling of the nozzle plate, failing nozzles, drop formation, and satellite formation.

More specifically 3D-objects can be prepared having parts which differ from other parts in hardness, flexibility, elongation at break, etc. This can be used, for example, in the preparation of flexographic printing forms where the bottom layers can be made more flexible than the top layers which can be made hard and inelastic. The transition from the flexible bottom layer to hard, inelastic top layer can be a continuous or a stepwise transition or a combination of both.

In the preparation of flexographic printing forms, an optimized mixture can be prepared depending on the type of support for which the flexographic printing form will be used. For example, the best printing results on an uneven surface, e.g., corrugated board, are obtained using thicker, softer flexographic printing forms. For smooth surfaces, such as polyethylene plastic bags or labels, it is more advantageous to use thinner, harder flexographic printing forms.

Other features, elements, steps, characteristics and advantages of the present invention will become more apparent from the following detailed description of preferred embodiments of the present invention with reference to the attached drawings.

BRIEF DESCRIPTION OF THE DRAWINGS

The following drawings are merely examples of possible constructions for mixing the inkjet fluids and inks in or at the inkjet printer.

DETAILED DESCRIPTION OF THE PREFERRED EMBODIMENTS

The term "fluid" is a substantially colourless liquid including one or more chemical components.

The term "inkjet fluid" is a fluid capable of being jetted by an inkjet printer, i.e., having a suitable surface tension and viscosity at jetting temperature.

The term "inkjet ink" is used when the "inkjet fluid" contains a colorant.

The term "inkjet fluid set", as used in disclosing the present invention means a set of two or more inkjet fluids for an inkjet printer.

The term "inkjet ink set", as used in disclosing the present invention means the inkjet ink set which is coupled to the inkjet printer. It can, for example, be made up from two separate commercially available CMYK inkjet ink sets each including four inkjet inks C, M, Y and K, as long as the inkjet inks of the same colour from both CMYK inkjet ink sets fulfil the requirements of the present invention. An inkjet ink set may further include one or more inkjet fluids.

The term "colorant", as used in disclosing the present invention means dyes and pigments.

The term "dye", as used in disclosing the present invention means a colorant having a solubility of 10 mg/L or more in the medium in which it is applied and under the ambient conditions pertaining.

The term "pigment" is defined in DIN 55943, herein incorporated by reference, as a colouring agent that is practically insoluble in the application medium under the pertaining ambient conditions, hence having a solubility of less than 10 mg/L therein.

The term "C.I." is used in disclosing the present application as an abbreviation for Colour Index.

The term "UV" is used in disclosing the present invention as an abbreviation for ultraviolet radiation.

The term "ultraviolet radiation" as used in disclosing the present invention means electromagnetic radiation in the wavelength range of 100 to 400 nanometres.

The term "wt %" is used in disclosing the present invention as an abbreviation for % by weight based upon the total weight of the ink or fluid unless otherwise specified.

The term "polyfunctional polymerizable compound" means a polymerizable compound having two or more copolymerizable groups.

The term "actinic radiation" as used in disclosing the present invention means electromagnetic radiation capable of initiating photochemical reactions, and thus excludes electron beam.

The term "Norrish Type I initiator" as used in disclosing the present invention, means an initiator which cleaves after excitation, yielding the initiating radical immediately.

The term "Norrish Type II initiator" as used in disclosing the present invention, means an initiator which in its excited state forms free radicals by hydrogen abstraction or electron extraction from a second compound that becomes the actual initiating free radical. The second compound is called co-initiator or polymerization synergist. Synergists are compounds having a carbon atom with at least one hydrogen atom in the $\alpha$-position to a nitrogen atom.

The term "photo-acid generator" as used in disclosing the present invention means an initiator, which generates an acid or hemi-acid upon exposure to actinic radiation. A photo-acid generator is often also called a cationic initiator.

The term "thermal initiator" as used in disclosing the present invention means an initiator, which generates initiating species upon exposure to heat.

The term "alkyl" means all variants possible for each number of carbon atoms in the alkyl group i.e., for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

The term "flexographic printing form" as used in disclosing the present invention, means a flat relief printing plate or a cylindrical printing sleeve.

3D-inkjet Printing Methods

A 3D-inkjet printing method including the steps of:
a) providing two or more fluids having a different composition to an inkjet printer;
b) mixing the two or more fluids in a controlled amount; and
c) jetting the mixture of the two or more fluids with the inkjet printer onto a support;
d) at least partially curing the jetted mixture by actinic radiation or electron beam; and
e) repeating steps b) to d) in order to build a 3D-relief on a support.

The two or more fluids having a different composition need not be jettable by themselves, as long as their mixture is jettable. However, preferably the two or more fluids are inkjet fluids, and therefore will be addressed as such here below. Since preferred embodiments of the present invention are feasible both with inks and fluids, if the wording used here below relates only to fluids, it should be understood to include inks, and vice versa.

Two fluids having a different composition will normally have different physical properties. A skilled person knows how to prepare compositions that differ enough to have different physical properties so that they can be useful in a 3D-inkjet printing method according to preferred embodiments of the present invention and that they embrace a broad range of the desired physical properties.

In one preferred embodiment of the 3D-inkjet printing method, the amount of a polymerizable compound in a first inkjet fluid of the two or more inkjet fluids differs from the amount in another inkjet fluid of the two or more inkjet fluids by at least 5 wt %, more preferably at least 10 wt %, based upon the total weight of the inkjet fluid.

In a preferred embodiment of the 3D-inkjet printing method, one of the two or more inkjet fluids has at least one component not present in the other fluid(s).

In a preferred embodiment of the 3D-inkjet printing method, the two or more inkjet fluids are all radiation curable inkjet fluids.

In a preferred embodiment of the 3D-inkjet printing method, at least one of the two or more inkjet fluids includes a colorant.

In another preferred embodiment of the 3D-inkjet printing method, the composition of the mixture made in step b) is changed at least once for step e). Although the possibilities of adapting the mixture of the two or more inkjet fluids increases with the number of inkjet fluids present in the inkjet fluid set, many problems of image quality and adhesion can already be solved by using only two inkjet fluids.

In a preferred embodiment of the 3D-inkjet printing method, the jetted mixture in step d) is partially cured at least 100 times, more preferably at least 300 times of repeating the steps b) to d) in step e).

In many occasions, partially curing leads to a better adhesion between the different layers jetted by the 3D-inkjet printing method according to preferred embodiments of the present invention.

A qualitative test for determining the curing degree is rubbing a coating immediately after curing with UV light by means of a Qtip. When the surface is not damaged, the coating is fully cured. When some of the surface can be damaged, the coating is only partly cured. When the surface is completely damaged, the coating is not cured.

The terms "partial cure" and "full cure" refer to the degree of curing, i.e., the percentage of converted polymerizable groups. This percentage is determined by RT-FTIR (Real-Time Fourier Transform Infrared Spectroscopy). A partial cure is defined as a curing degree wherein at least 5%, more preferably at least 10%, of the polymerizable groups are converted. A full cure is defined as a curing degree wherein the increase in the percentage of converted polymerizable groups, with increased exposure to radiation, is negligible. The full cure state corresponds with a conversion percentage within 10%, preferably 5%, from the maximum conversion defined by the horizontal asymptote in the RT-FTIR graph (percentage conversion versus curing energy).

The RT-FTIR determination of the curing degree is a method well-known to the one skilled in the art of curable formulations. For example, for curable liquids based upon monomers including acrylate groups, a skilled person would normally look with RT-FTIR at two peaks: one in an absorption band around 810 cm$^{-1}$ and one in an absorption band around 1725 cm$^{-1}$. The peak at 810 cm$^{-1}$ corresponds with the "C—H"-vibrations of the double bond in the acrylate group and the peak height decreases as the curing proceeds. The peak at 1725 cm$^{-1}$ corresponds with the "C=O"-vibrations of the ester in the acrylate group and can be used as an internal reference, since the peak height doesn't change during curing. The decrease in the ratio of the peak height at 810 cm$^{-1}$ versus the peak height at 1725 cm$^{-1}$ is indicative for the curing degree. Alternatively it is also possible to compare the integrated surface under both peaks for determining the curing degree.

In another preferred embodiment, the inkjet fluid set includes three inkjet fluids for handling all the different physical properties.

In one preferred embodiment the inkjet fluid set includes two inkjet fluids wherein a first inkjet fluid includes a large amount of one or more surfactants and a second inkjet fluid differs only by lacking a surfactant or containing a small amount of one or more surfactants. By mixing the two inkjet fluids in an ink supply system any desired surface tension of the mixture can be obtained provided that suitable surfactants were chosen and that these were present in high enough amounts in the first inkjet fluid to encompass the whole range of desired surface tensions. Controlling the surface tension allows the printer to obtain the same spreading characteristics on supports differing in surface energy.

Preferred embodiments of the present invention are feasible both with inks and fluids, and a colorant is generally only present for aesthetical reasons. However, sometimes a colorant may be used for functional reasons like improving the visibility of the printed relief image. Another example is a flexographic printing form having a cyan colour, to indicate that this flexographic form is to be used for the printing of cyan ink, while another flexographic printing form has a magenta colour to indicate that it is to be used for the printing with magenta ink. In 3D-printing, colour inkjet inks may be used to give different areas of the 3D-object a different colour.

An ink set including at least one fluid and one ink may be used to differentiate in colour, e.g., the flexographic printing form can be made by the method of a preferred embodiment of the invention using a fluid for the lower layers (forming an elastic base layer) and an ink for the top layers forming the relief for printing.

Inkjet Printer & Ink Supply Systems

Industrial inkjet printers generally include an ink supply system for supplying ink to an inkjet print head. Inkjet print heads produce drops either continuously or on demand. "Continuously" means that a continuous stream of ink drops is created, e.g., by pressurizing the ink supply. "On demand" differs from "continuous" in that ink drops are only ejected from a print head by manipulation of a physical process to momentarily overcome surface tension forces that keep the ink in the print head. The ink is held in a nozzle, forming a meniscus. The ink remains in place unless some other force overcomes the surface tension forces that are inherent in the liquid. The most common practice is to suddenly raise the pressure on the ink, ejecting it from the nozzle. One category of drop-on-demand inkjet print heads uses the physical phenomenon of electrostriction, a change in transducer dimension in response to an applied electric field. Electrostriction is strongest in piezoelectric materials and hence these print heads are referred to as piezoelectric print heads. The very small dimensional change of piezoelectric material is harnessed over a large area to generate a volume change that is large enough to squeeze out a drop of ink from a small chamber. A piezoelectric print head includes a multitude of small ink chambers, arranged in an array, each having an individual nozzle and a percentage of transformable wall area to create the volume changes required to eject an ink drop from the nozzle, in according with electrostriction principles.

In a preferred embodiment the inkjet printer is a drop-on-demand ink jet printing system having piezoelectric print heads for delivering inkjet fluid or ink droplets to a support.

The inkjet fluid or ink is supplied to the ink ejecting chambers of a print head by an ink supply system that first conditions the fluid or ink in order to obtain smooth operation of the inkjet print head. Conditioning includes, for example, degassing of the fluid or ink and controlling the back-pressure at the nozzle.

It is known that the presence of air bubbles in the ink chamber of a piezoelectric print head often causes operational failure of the print head. If air is present in the ink chamber, intended pressure changes resulting from piezoelectric deformation of part of the ink chamber walls will be absorbed by the air, leaving the ink pressure unaffected. The surface tension force of the inkjet fluid or inkjet ink in the nozzle maintains the meniscus and no drops will be ejected from the ink chamber. At the frequencies at which piezoelectric transducers in piezoelectric print head are operated, i.e., in the kHz to MHz range, not only air bubbles but also dissolved air in the ink can cause operation failure as described above. In the prior art, concepts have been disclosed to avoid air bubbles in the ink chamber by creating an air trap upstream the ink chamber, i.e., prior to the ink entering the ink chamber. Solutions have been proposed in EP 714779 A (CANON) and U.S. Pat. No. 4,929,963 (HP) in the form of air buffers or gas separators that allow air bubbles to rise and evacuate from the ink in an intermediate tank before the ink is supplied to the print head.

A second point of attention in ink supply systems is the pressure at the nozzle, which is critical to a well-tuned and good operating print head. Inkjet print heads operate best at a slightly negative nozzle pressure or back-pressure. In practice this is often achieved by maintaining a height difference between the free ink surface in a vented ink supply tank and the meniscus in the nozzle. That is, the free ink surface in the vented supply tank is maintained gravimetrically a couple of centimetres below the level of the meniscus in the nozzle. This height difference established a hydrostatic pressure difference to control the back-pressure at the nozzle. In reciprocating print head configurations the ink supply tank is located off axis, i.e., not scanning, because otherwise the lowered position of ink supply tank versus the print head would interfere with the printing medium transport path. Flexible tubing is used to connect the off axis ink supply tank with the on axis print head, as disclosed in for example U.S. Pat. No. 4,929,963 (HP). During acceleration and deceleration of the print head, pressure waves are created in the tubes that may significantly disturb the pressure balance at the meniscus and may lead to weeping of the nozzle in the case of a decrease in negative pressure, or breaking of the meniscus in the case of an increase in negative pressure and taking air into the ink channel. Many approaches have been proposed to control the back-pressure in reciprocating print head applications. A back-pressure regulation mechanisms in the form of pressure buffers or dampers mounted together with the print head on the reciprocating carriage are disclosed in EP 1120257 A (SEIKO EPSON) and U.S. Pat. No. 6,485,137 (APRION DIGITAL). For accelerations and decelerations of the carriage above 1 G the response time of these devices is insufficient. In EP 1142713 A (SEIKO EPSON) a vented sub tank is used. The sub tank serves as a local ink reservoir near the print head and is being filled intermittently from a main tank located off axis. The solution provides a better control of the nozzle back-pressure by maintaining a local hydrostatic pressure difference between the free ink surface of the vented sub tank and the meniscus.

An inkjet printer for making 3D-objects according to a preferred embodiment includes a) a mixer arranged to mix two or more fluids; and b) a moving device arranged to move a print head during printing in both a horizontal and a vertical direction.

The inkjet printer for making flexographic printing forms, especially flexographic printing sleeves, is preferably an inkjet printer including a rotating drum for holding a flexographic support. For other 3D-objects, a flat bed inkjet printer is generally used.

In 3D-inkjet printing, it is essential that the 3D-object is produced layer by layer, because an initially created relief would hinder further movements of the print head for creating another relief.

In creating a 3D-relief, it is common practice to lower the ink-receiving surface before jetting the next layer. For making flexographic printing sleeves on a rotating drum, a less complex design was possible by moving, instead of the drum, the print head further away from the original drum surface as printing progresses. Different devices for moving the print head away from the drum in a vertical direction, i.e., a direction perpendicular on the drum surface, are known to a skilled person and include e.g., a screw device operated by an electrical motor.

Figure 6:
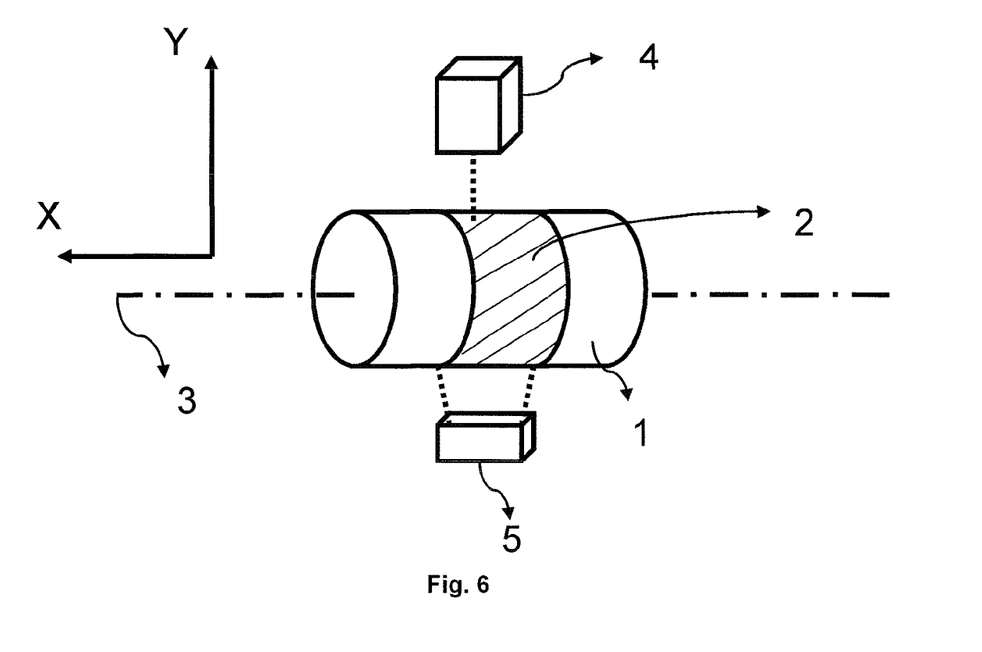
FIG. 6 is a schematic representation of an inkjet printer suitable for 3D-inkjet printing.

An inkjet printer suitable for 3D-inkjet printing, especially for preparing a flexographic printing form is shown by FIG. 6. A support (2) with the shape of a sleeve is mounted on a drum (1) rotating around its axis (3). A mixture of two or more inkjet fluids is jetted by the print head (4) onto the support (2). After jetting of the mixture on the support (2), the jetted mixture rotates towards an area where it is exposed by the curing device (5). The curing device (5) can be a radiation curing device, such as a UV-lamp or a series of UV-LEDs, but it can also be an electron beam curing device, or a combination of both. The curing of each layer can be complete, but preferably a partial curing or pin curing is performed, preferably accompanied with a final full curing step after jetting of all the layers. The cured jetted fluid is then rotated further by the drum (1) to the area where a second layer of the mixture can be jetted upon the cured jetted fluid. This cycle is repeated a number of times until one obtains a relief of sufficient height. Generally a relief having a height between 0.2 to 4 mm, more preferably 0.4 mm to 2 mm is desirable. As the creation of the relief progresses, the distance of the print head (4) to the support would diminish, hence leading to image artefacts. Therefore, the distance between the support (2) and the print head (4) is kept approximately constant. This is preferably done by moving the print head (4) away from the drum (1) in a vertical direction Y, i.e., in a direction perpendicular on the rotation axis (3). The inkjet print head (4) is capable of shuttling in the horizontal direction X, i.e., parallel with the rotation axis (3), to cover to full width of the support (2). The rotation speed of the drum (1) is adapted to the shuttling speed of the print head (4) in the X-direction in order to cover also the complete area in the Y-direction.

It is also possible to use more than one print head (4) to increase productivity. If more than one print head (4) is used, then preferably they are arranged in a staggered array.

Another preferred embodiment to increase productivity, is by using a page wide print head or an array of staggered print heads covering the full width of the support (2).

Ink Mixer

There are no real limitations for selecting the mixer to mix the fluids and inks as long as they are made from materials compatible with the fluids or inks, e.g., solvent-resistant materials when inkjet inks or fluids including solvents are to be mixed.

The inks can be mixed at various locations of the inkjet printer, for example, close to the inkjet print heads or even inside the print heads. The smaller the distance between the location of the ink mixing and the print head nozzles, the less ink is spilled for preparing the new mixture.

In one preferred embodiment, the ink mixer has a compact design so that it is possible to incorporate it into a carriage including an assembly of print heads that moves back and forth along the fast scan direction.

Preferably, an ink mixer is selected that does not introduce air bubbles into the mixture of inks and/or fluids.

Although not required for obtaining a consistent image quality in colour gamut, preferably an ink mixer is selected wherein the fluids and inks are mixed quite accurately.

For some inkjet fluids and inks, such as fluids and dye based inks, the ink mixer may simply consist of conduits that come together in one conduit, which makes a number of sharp turns or V-turns in order to mix the inks.

More complex ink mixers may include pumps, valves, mixing chambers, etc.

If necessary, the ink mixing may be performed with cooling to prevent build up of heat. For radiation curable inkjet inks, the ink mixing is performed as much as possible under light conditions in which actinic radiation has been substantially excluded.

Figure 1:
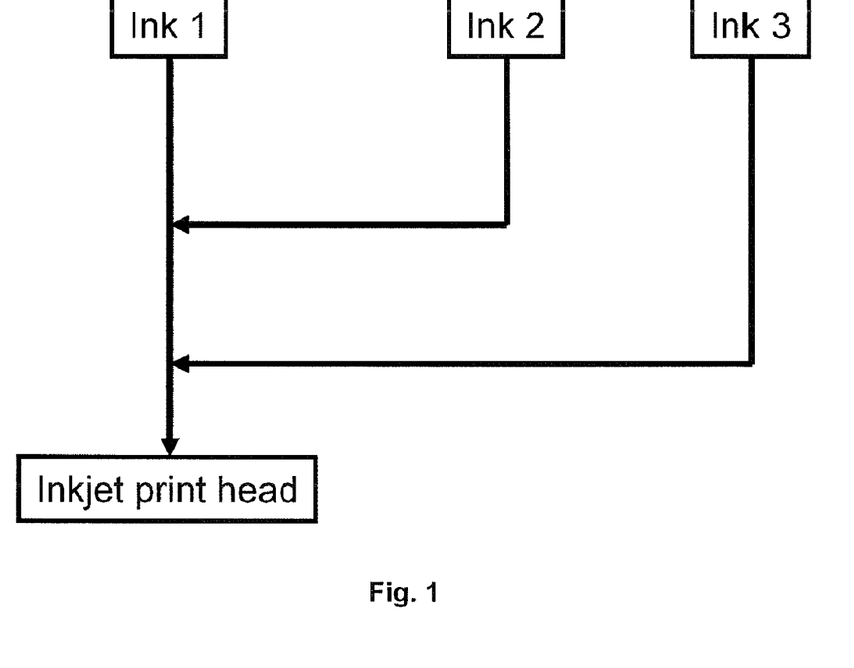
FIG. 1 is a schematic view of a system supplying a first ink "Ink 1" to the inkjet print head via a conduit wherein a second ink "Ink 2" and consecutively a third ink "Ink 3" are added in a controlled amount.
Figure 2:
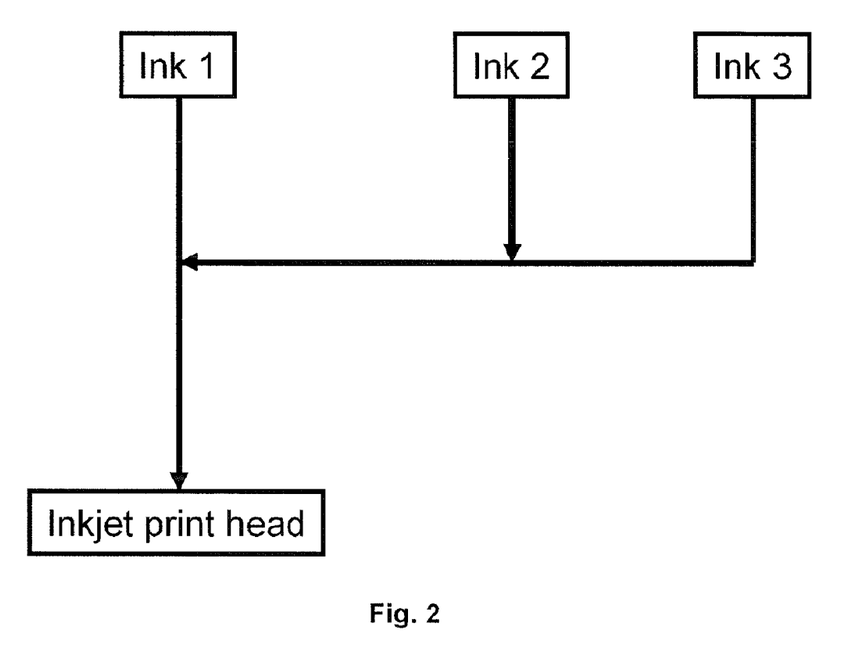
FIG. 2 is a schematic view of a system supplying a first ink "Ink 1" to the inkjet print head via a conduit wherein a mixture of a second ink "Ink 2" and a third ink "Ink 3" is added in a controlled amount.

In one preferred embodiment, the two or more inkjet inks having different physical properties after curing are supplied to an inkjet print head via a conduit wherein the ink mixture is prepared in-situ in the conduit. A flow controller is adapted to selectably meter ink from the two or more inkjet ink sources into the conduit between the source of one inkjet ink and the ejecting chambers of the print head. Ink supply systems according to this preferred embodiment are exemplified by FIG. 1 and FIG. 2.

Figure 3:
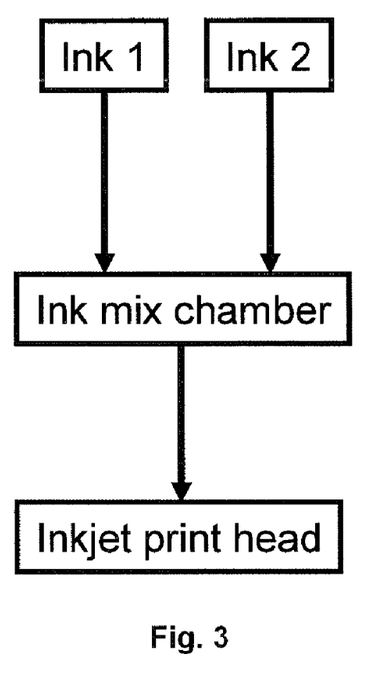
FIG. 3 is a schematic view of a system supplying in a controlled amount a first ink "Ink 1" and a second ink "Ink 2" to an ink mixing chamber which then delivers the ink mixture to the inkjet print head.

In another preferred embodiment, the ink supply system includes an ink mix chamber wherein the two or more inkjet inks are first mixed in a controlled amount before delivering this ink mixture to the print head. An ink supply system according to this preferred embodiment is exemplified by FIG. 3.

Figure 4:
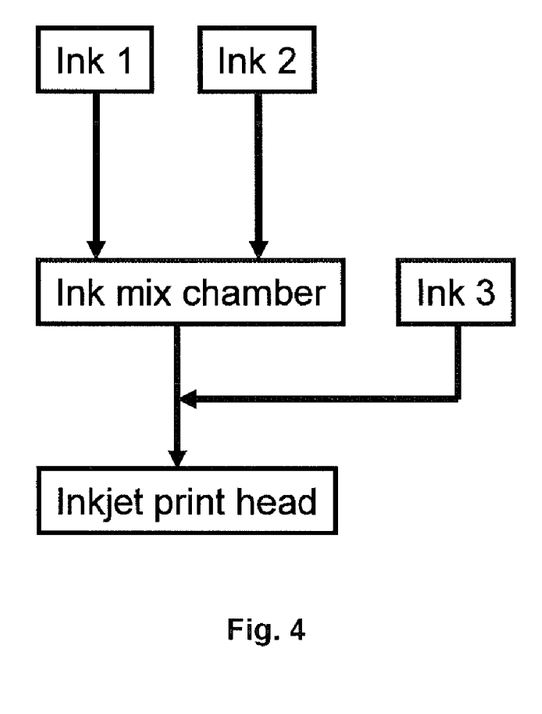
FIG. 4 is a schematic view of a system supplying in a controlled amount a first ink "Ink 1" and a second ink "Ink 2" to an ink mixing chamber which delivers the ink mixture to the inkjet print head via a conduit wherein a third ink "Ink 3" is added in a controlled amount.

The two previous preferred embodiments can also be combined to provide an ink supply system wherein at least three inkjet inks are mixed in a controlled amount partly in an ink mix chamber and partly in-situ in a conduit between the ink mix chamber and the print head. An ink supply system according to this preferred embodiment is exemplified by FIG. 4.

Figure 5:
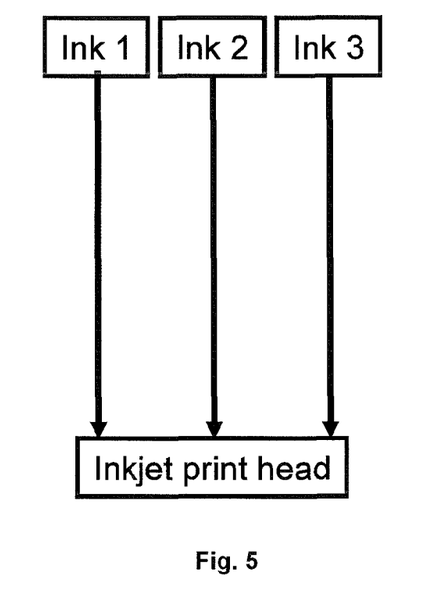
FIG. 5 is a schematic view of a system supplying a first ink "Ink 1", a second ink "Ink 2" and a third ink "Ink 3" in a controlled amount to an ink mix chamber (not shown) incorporated in the inkjet print head.

In another preferred embodiment the mixing in a controlled amount of the two or more inkjet inks occurs inside the print head. An ink supply system according to this preferred embodiment is exemplified by FIG. 5.

It can be advantageous to locate (part of) the ink mixing system inside the print head for having a fast response in changing the composition of the mixture, but the ink mixing system is preferably separated from the print head. This allows connection of the ink supply system to a wide range of already commercially available print heads, and hence does not increase the complexity and development cost of print heads. Moreover, the maintenance is much easier in an ink mixing system not located inside the print head when, for example, flocculation of the inks would occur.

Computing Device

In a preferred embodiment, the ink supply system is connected to a computer for controlling the ink mixing process. This may include the opening and closing of valves, the control of the flow by pumps, the rotation speed of a stirrer and other mechanical settings, to obtain the desired ink mixture. However, the computer is preferably also used to store and recall data of ink mixtures used to obtain specific physical properties. This allows for fast adjustment of the inkjet printer.

In another preferred embodiment, the computer may be used to produce a test pattern of different ink mixtures which after examination of the printed pattern allows the selection of the ink mixture exhibiting the desired properties of image quality, hardness, flexibility, resilience, adhesion, etc. This method results in a digital library of ink mixing data. This ink mixing data includes the ratio of the inkjet fluids or inks and its relation to image quality and physical properties. The use of a library, more preferably a digital library, leads to enhanced productivity.

Flexographic Support

A flexographic support is a support provided with or without one or more elastomeric layers, e.g., partially or fully cured layers. Preferably, the flexographic support includes one or more cured layers, i.e., an "elastomeric floor", provided on the relief forming side of the support.

The support can be any material that is conventionally used with photosensitive elements used to prepare flexographic printing masters. For good printing results, a dimensionally stable support is required.

Preferably the support is transparent to actinic radiation to accommodate "backflash" exposure through the support. Such a back exposure results in curing at least a part of the photopolymerizable layers nearest to the support, this part forming the "elastomeric floor". The mixture of two or more inkjet fluids is jetted on the partially or not cured surface of the elastomeric layer, and both are cured together through which a better adhesion result can be obtained. Alternatively, it is also possible to use a completely cured conventional flexographic printing form precursor as support. A wide variety of such conventional flexographic printing forms precursors are commercially available.

Examples of suitable support materials include polymeric films such as those formed by addition polymers and linear condensation polymers, transparent foams and fabrics. Under certain end-use conditions, metals such as steel, aluminum, copper and nickel may also be used as a support, even though a metal support is not transparent to radiation. The support may be in sheet form or in cylindrical form, such as a sleeve. The sleeve may be formed from single layer or multiple layers of flexible material, as for example disclosed by US 20020046668 A (ROSSINI). Flexible sleeves made of polymeric films can be transparent to ultraviolet radiation and thereby accommodate backflash exposure for building a floor in the cylindrical printing element. Multiple layered sleeves may include an adhesive layer or tape between the layers of flexible material. Preferred is a multiple layered sleeve as disclosed in U.S. Pat. No. 5,301,610 (DU PONT). The sleeve may also be made of non-transparent, actinic radiation blocking materials, such as nickel or glass epoxy. The support typically has a thickness from 0.002 to 0.050 inch (0.0051 to 0.127 cm). A preferred thickness for the sheet form is 0.003 to 0.016 inch (0.0076 to 0.040 cm). The sleeve typically has a wall thickness from 0.1 to 1 mm for thin sleeves and from 1 to as high as 100 mm for other sleeves. The used wall thickness depends upon the application.

Preferred polymeric supports for use in the method for manufacturing a flexographic printing master according to a preferred embodiment of the present invention, are cellulose acetate propionate, cellulose acetate butyrate, polyesters such as polyethylene terephthalate (PET) and polyethylene naphthalate (PEN); oriented polystyrene (OPS); oriented nylon (ONy); polypropylene (PP), oriented polypropylene (OPP); polyvinyl chloride (PVC); and various polyamides, polycarbonates, polyimides, polyolefins, poly(vinylacetals), polyethers and polysulfonamides, opaque white polyesters and extrusion blends of polyethylene terephthalate and polypropylene. Acrylic resins, phenol resins, glass and metals may also be used as an ink-receiver. Other suitable supports can be found in Modern Approaches to Wettability: Theory and Applications. Edited by SCHRADER, Malcolm E., et al. New York: Plenum Press, 1992. ISBN 0306439859.

Different types of printing applications require flexographic printing forms with differing degrees of hardness. Softer flexographic printing forms are more suited for rough supports because they can better cover the highs and lows. The harder flexographic printing forms are used for even and smooth supports. The optimum hardness of a flexographic printing form also depends on whether the image is solid or halftone. Softer flexographic printing forms will transfer the ink better in solid areas, though harder flexographic printing forms have less dot gain. In an image composed of solid areas and halftone areas, inkjet printing allows the printing of different mixtures of two or more inkjet fluids on the solid and the halftone areas which is an advantage not attainable by a traditional flexographic printing form. Thus a flexographic printing form having a hardness which differs by at least 5° Shore A in two different surface areas of the flexographic printing form can be made.

Depending on the support being printed, the hardness and thickness of the flexographic printing form have to be adjusted. Depending on the application, the relief depth varies from 0.2 to 4 mm, preferably from 0.4 to 2 mm.

The hardness is a measure of the printing form's mechanical properties which is measured in degree of Shore A. For example, printing on corrugated board requires usually a hardness of 35° Shore A, whereas for reel presses 65° Shore A is a standard.

Inkjet Fluid Sets

The inkjet fluid set according to a preferred embodiment of the present invention includes two or more inkjet fluids wherein the amount of polyfunctional polymerizable compounds in a first inkjet fluid of the two or more inkjet fluids differs from the amount in another inkjet fluid of the two or more inkjet fluids by at least 10 wt %, more preferably at least 20 wt % based upon the total weight of the polymerizable composition of the inkjet fluids.

In a preferred embodiment of the inkjet fluid set, at least one inkjet fluid of the two or more inkjet fluids includes at least 30 wt %, more preferably at least 40 wt % of a monofunctional monomer.

In a preferred embodiment of the inkjet fluid set, at least one inkjet fluid of the two or more inkjet fluids includes at least 20 wt %, based upon the total weight of the polymerizable composition of the inkjet fluid, of a polymerizable compound selected from the group consisting of bisphenol A epoxyacrylate, epoxy soya bean oil acrylate, fatty acid modified bisphenol A epoxy acrylate, monofunctional aliphatic urethane acrylate, 2-(2-ethoxyethoxy)ethyl acrylate, ethoxylated nonyl phenol acrylate, lauryl acrylate, isobornylacrylate, isodecyl acrylate, 2-phenoxyethyl acrylate, tetra hydrofurfuryl acrylate, polyethylene glycol diacrylate, ethoxylated neopentylglycol diacrylate, propoxylated neopentylglycol diacrylate, tetraethylene glycol diacrylate, tripropylene glycol diacrylate, 2-(2-vinyloxyethoxy)ethyl acrylate and hexanediol diacrylate or combinations thereof.

In a preferred embodiment of the inkjet fluid set, the amount of the selected polymerizable compound in a second inkjet fluid of the two or more inkjet fluids differs by at least 10 wt % based upon the total weight of the polymerizable composition of the inkjet fluids.

In a preferred embodiment of the inkjet fluid set, at least one of the polyfunctional polymerizable compounds is selected from the group consisting of trifunctional (meth)acrylates, tetrafunctional (meth)acrylates, pentafunctional (meth)acrylates and hexafunctional (meth)acrylates.

In one preferred embodiment the two or more inkjet fluids contain a different amount of surfactant and/or different types of surfactant.

In preferred embodiment the two or more inkjet fluids are radiation curable inkjet fluids.

In a further preferred embodiment of radiation curable inkjet fluids, the same photo-initiator is present in the two or more radiation curable inkjet fluids. In a further preferred embodiment, the same co-initiator is present in the two or more inkjet fluids. When the same or approximately the same photoinitiating system is used, no substantial differences in curing speed occur, which simplifies the curing conditions. However, sometimes it can be advantageous to use a different photoinitiating system exhibiting a different curing speed in order to obtain different physical properties.

An inkjet fluid set can be advantageously used to prepare mixtures for making 3D-objects exhibiting a different hardness, creep recovery or elongation at break. For the purpose of this invention, the hardness is considered to be different when two samples differ by at least 5 Shore A. For the purpose of this invention, the creep recovery is considered to be different when two samples differ by at least 5% in creep recovery. For the purpose of this invention, the elongation at break is considered to be different when two samples differ by at least 10% in elongation at break.

The inkjet fluid set in the inkjet printer may include the two or more inkjet fluids in a different volume. Sometimes one fluid can be consumed much faster than another, for example, because the other ink is tuned towards higher hardness and less frequently used in a certain printing environment, e.g., for flexographic printing mostly on corrugated board.

Inkjet Fluids and Inks

The inkjet fluids in an inkjet fluid set according a preferred embodiment of the present invention are preferably non-aqueous inkjet fluids. In a non-aqueous inkjet ink the components are present in a dispersion medium which is a non-aqueous liquid at jetting temperature.

The term "non-aqueous liquid" refers to a liquid carrier which should contain no water. However sometimes a small amount, generally less than 5 wt % of water based on the total weight of the ink, can be present. This water was not intentionally added but came into the formulation via other components as a contamination, such as for example polar organic solvents. Higher amounts of water than 5 wt % tend to make the non-aqueous inkjet inks instable, preferably the water content is less than 1 wt % based on the total weight dispersion medium and most preferably no water at all is present.

In a preferred embodiment of the inkjet fluid set, at least one of the inkjet fluids contains a colorant. An inkjet ink is an inkjet fluid containing a colorant. Preferably, the colorant is a pigment. If the colorant is not a self-dispersible pigment, the inkjet ink preferably also contains a dispersant, more preferably a polymeric dispersant.

The inkjet ink of an inkjet fluid set according to a preferred embodiment of the present invention may further also contain at least one surfactant.

The pigmented inkjet ink may contain at least one dispersion synergist. A mixture of dispersion synergists may be used to further improve dispersion stability The curable inkjet ink is preferably radiation curable, most preferably UV curable.

The viscosity of the inkjet ink is preferably smaller than 100 mPa·s at 30° C. and at a shear rate of 100 s$^{-1}$. The viscosity of the inkjet ink is preferably smaller than 30 mPa·s, more preferably smaller than 15 mPa·s, and most preferably between 2 and 10 mPa·s at a shear rate of 100 s$^{-1}$ and a jetting temperature between 10 and 70° C.

The curable inkjet ink may contain as dispersion medium monomers, oligomers and/or prepolymers possessing different degrees of functionality. A mixture including combinations of mono-, di-, tri- and/or higher functionality monomers, oligomers or prepolymers may be used. A catalyst called an initiator for initiating the polymerization reaction may be included in the curable inkjet ink. The initiator can be a thermal initiator, but is preferably a photo-initiator. The photo-initiator requires less energy to activate than the monomers, oligomers and/or prepolymers to form the polymer. The photo-initiator suitable for use in the curable pigment dispersion may be a Norrish type I initiator, a Norrish type II initiator or a photo-acid generator.

The curable inkjet ink may further also contain at least one inhibitor.

When inkjet inks are used, the inkjet fluid set according to a preferred embodiment of the present invention is preferably a CMYK inkjet ink set.

A CMYK inkjet ink set may also be extended with one or more extra inks such as red, green, blue and orange to further enlarge the colour gamut. The CMYK ink set may also be extended by the combination of full density and light density inks of both colour inks and/or black inks.

Colorants

The inkjet inks contain at least one colorant.

Colorants used in the inkjet inks may be pigments, dyes or a combination thereof. Organic and/or inorganic pigments may be used.

The pigments in the inkjet inks may be black, white, cyan, magenta, yellow, red, orange, violet, blue, green, brown, mixtures thereof, and the like.

The colour pigment may be chosen from those disclosed by HERBST, Willy, et al. Industrial Organic Pigments, Production, Properties, Applications. 3rd edition. Wiley—VCH, 2004. ISBN 3527305769.

Particular preferred pigments and non-organic pigments are those disclosed by the section "Colorants" in EP 1854851 A (AGFA GRAPHICS) at paragraphs [0062] to [0070] enclosed herein as a specific reference.

It is also possible to make mixtures of pigments in the inkjet inks. For some applications, a neutral black inkjet ink is preferred and can be obtained, for example, by mixing a black pigment and a cyan pigment into the ink. The inkjet application may also require one or more spot colours, for example for packaging inkjet printing. Silver and gold are often desired colours for poster printing and point-of-sales displays.

Generally pigments are stabilized in the dispersion medium by dispersing agents, such as polymeric dispersants or surfactants. However, the surface of the pigments can be modified to obtain so-called "self-dispersible" or "self-dispersing" pigments, i.e., pigments that are dispersible in the dispersion medium without dispersants.

Pigment particles in inkjet ink should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.030 and 1 μm, more preferably between 0.070 and 0.300 μm and particularly preferably between 0.080 and 0.200 μm. Most preferably, the numeric average pigment particle size is no larger than 0.150 μm. However, the average pigment particle size for white inkjet inks including, for example, a titanium dioxide pigment, is preferably between 0.100 and 0.300 μm.

The pigment is preferably used in the pigment dispersion used for preparing the inkjet inks in an amount of 10 to 40 wt %, preferably 15 to 30 wt % based on the total weight of the pigment dispersion. In the inkjet ink the pigment is preferably used in an amount of 0.1 to 20 wt %, preferably 1 to 10 wt % based on the total weight of the inkjet ink.

Dyes suitable for the inkjet inks in the ink set include direct dyes, acidic dyes, basic dyes and reactive dyes.

Suitable dyes are those disclosed by the section "Colorants" in WO 2007/045580 (AGFA GRAPHICS) at paragraphs [0101] to [0104] enclosed herein as a specific reference.

The dye may be chosen from those disclosed by ZOLLINGER, Heinrich. Color Chemistry: Syntheses, Properties, and Applications of Organic Dyes and Pigments. 3rd edition. Wiley—VCH, 2004. ISBN 3906390233.

If the inkjet ink contains water, dyes may manifest the ideal colour in an appropriate range of pH value. Therefore, the inkjet ink preferably further includes a pH adjuster.

Suitable pH adjusters include NaOH, KOH, NEt$_3$, NH$_3$, HCl, HNO$_3$, H$_2$SO$_4$ and (poly)alkanolamines such as triethanolamine and 2-amino-2-methyl-1-propaniol. Preferred pH adjusters are NaOH and H$_2$SO$_4$.

The dyes are used in an inkjet ink in an amount of 0.1 to 30 wt %, preferably 1 to 20 wt % based on the total weight of the inkjet ink.

In a specific preferred embodiment the colorant is a fluorescent colorant used to introduce security features.

Suitable examples of a fluorescent colorant include TINOPAL™ grades such as TINOPAL™ SFD, UVITEX™ grades such as UVITEX™ NFW and UVITEX™ OB, all available from CIBA SPECIALTY CHEMICALS; LEUKOPHOR™ grades from CLARIANT and BLANCOPHOR™ grades such as BLANCOPHOR™ REU and BLANCOPHOR™ BSU from BAYER.

Dispersants

Typical polymeric dispersants are copolymers of two monomers but may contain three, four, five or even more monomers. The properties of polymeric dispersants depend on both the nature of the monomers and their distribution in the polymer. Suitable copolymeric dispersants have the following polymer compositions:

statistically polymerized monomers (e.g., monomers A and B polymerized into ABBAABAB);
  alternating polymerized monomers (e.g., monomers A and B polymerized into ABABABAB);
  gradient (tapered) polymerized monomers (e.g., monomers A and B polymerized into AAABAABBABBB);
  block copolymers (e.g., monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with side chains attached to the backbone); and mixed forms of these polymers, e.g., blocky gradient copolymers.

Polymeric dispersants may have different polymer architecture including linear, comb/branched, star, dendritic (including dendrimers and hyperbranched polymers). A general review on the architecture of polymers is given by ODIAN, George, Principles Of Polymerization, 4th edition, Wiley-Interscience, 2004, p. 1-18.

Comb/branched polymers have side branches of linked monomer molecules protruding from various central branch points along the main polymer chain (at least 3 branch points).

Star polymers are branched polymers in which three or more either similar or different linear homopolymers or copolymers are linked together to a single core.

Dendritic polymers include the classes of dendrimers and hyperbranched polymers. In dendrimers, with well-defined mono-disperse structures, all branch points are used (multi-step synthesis), while hyperbranched polymers have a plurality of branch points and multifunctional branches that lead to further branching with polymer growth (one-step polymerization process).

Suitable polymeric dispersants are those disclosed by the section "Dispersants" in EP 1854851 A (AGFA GRAPHICS) at paragraphs [0086] to [0096] enclosed herein as a specific reference.

One polymeric dispersant or a mixture of two or more polymeric dispersants may be present to improve the dispersion stability further. Sometimes surfactants can also be used as pigment dispersants, thus a combination of a polymeric dispersant with a surfactant is also possible.

The polymeric dispersant can be non-ionic, anionic or cationic in nature; salts of the ionic dispersants can also be used.

The polymeric dispersant has preferably a polymerization degree DP between 5 and 1,000, more preferably between 10 and 500 and most preferably between 10 and 100.

The polymeric dispersant has preferably a number average molecular weight Mn between 500 and 30,000, more preferably between 1,500 and 10,000.

The polymeric dispersant has preferably an average molecular weight Mw smaller than 100,000, more preferably smaller than 50,000 and most preferably smaller than 30,000.

The polymeric dispersant has preferably a polymeric dispersity PD smaller than 2, more preferably smaller than 1.75 and most preferably smaller than 1.5.

The polymeric dispersant is preferably used in an amount of 2 to 600 wt %, more preferably 5 to 200 wt % based on the weight of the pigment.

Dispersion Synergists

The dispersion synergist usually consists of an anionic part and a cationic part. The anionic part of the dispersion synergist exhibiting a certain molecular similarity with the colour pigment and the cationic part of the dispersion synergist consists of one or more protons and/or cations to compensate the charge of the anionic part of the dispersion synergist.

The synergist is preferably added in a smaller amount than the polymeric dispersant(s). The ratio of polymeric dispersant/dispersion synergist depends upon the pigment and should be determined experimentally. Typically the ratio wt % polymeric dispersant/wt % dispersion synergist is selected between 2:1 to 100:1, preferably between 2:1 and 20:1.

Particular preferred pigments for the magenta ink used are a diketopyrrolo-pyrrole pigment or a quinacridone pigment.

Suitable dispersion synergists include those disclosed in EP A (AGFA GRAPHICS) and EP 1790695 A (AGFA GRAPHICS).

In dispersing C.I. Pigment Blue 15:3, the use of a sulfonated Cu-phthalocyanine dispersion synergist, e.g., SOLSPERSE 5000 from NOVEON is preferred. Suitable dispersion synergists for yellow inkjet inks include those disclosed in EP A (AGFA GRAPHICS).

Dispersion Media

In one preferred embodiment the dispersion medium includes organic solvent(s). Suitable organic solvents include alcohols, ketones, esters, ethers, glycols and polyglycols and derivatives thereof, lactones, N-containing solvents such as amides. Preferably mixtures of one or more of these solvents are used.

Examples of suitable organic solvents are those disclosed by the section "Dispersion Media and Liquid Components of the ink" in EP 1854851 A (AGFA GRAPHICS) at paragraphs [0099] to [0113] enclosed herein as a specific reference.

In another preferred embodiment the dispersion medium includes oil types of liquids, alone or in combination with organic solvent(s). Suitable organic solvents include alcohols, ketones, esters, ethers, glycols and polyglycols and derivatives thereof, lactones, N-containing solvents such as amides, higher fatty acid ester and mixtures of one or more of the solvents as described above for solvent based dispersion media.

The amount of polar solvent is preferably lower than the amount of oil. The organic solvent has preferably a high boiling point, preferably above 200° C. Examples of suitable combinations are disclosed by EP 0808347 A (XAAR) especially for the use of oleyl alcohol and EP 1157070 A (MARCONI DATA SYSTEMS) for the combination of oil and volatile organic solvent.

Suitable oils are those disclosed by the section "Dispersion Media and Liquid Components of the ink" in EP A (AGFA GRAPHICS) at paragraphs [0117] to [0130] enclosed herein as a specific reference.

Most preferably, non-aqueous pigment dispersion is a curable pigment dispersion wherein the liquid dispersion medium consists of one or more monomers and/or oligomers. Sometimes, it can be advantageous to add a small amount of an organic solvent to improve the dissolution of the dispersant. The content of organic solvent or oil should be lower than 20 wt % based on the total weight of the inkjet ink. In other cases, it can be advantageous to add a small amount of water, for example, to improve the spreading of the inkjet ink on a hydrophilic surface, but preferably the inkjet ink contains no water.

Monomers and Oligomers

Any monomer or oligomer may be used as curable compound for the curable inkjet ink. A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used. The viscosity of the inkjet ink can be adjusted by varying the ratio between the monomers and oligomers.

Any method of conventional radical polymerization, photo-curing system using photo acid or photo base generator, or photo induction alternating copolymerization may be employed. In general, radical polymerization and cationic polymerization are preferred, and photo induction alternating copolymerization needing no initiator may also be employed. Furthermore, a hybrid system of combinations of these systems can also be effective.

Cationic polymerization is superior in effectiveness due to lack of inhibition of the polymerization by oxygen, however it is expensive and slow, especially under conditions of high relative humidity. If cationic polymerization is used, it is preferred to use an epoxy compound together with an oxetane compound to increase the rate of polymerization. Radical polymerization is the preferred polymerization process.

Any polymerizable compound commonly known in the art may be employed. Particularly preferred polymerizable compounds are those disclosed by the section "Dispersion Media and Liquid Components of the ink" in EP 1854851 A (AGFA GRAPHICS) at paragraphs [0133] to [0134] enclosed herein as a specific reference.

A preferred class of monomers and oligomers which can be used in both radiation and cationically curable compositions are vinyl ether acrylates such as those described in U.S. Pat. No. 6,310,115 (AGFA), incorporated herein by reference. Particularly preferred compounds are 2-(2-vinyloxyethoxy) ethyl (meth)acrylate and vinyloxyethyl(meth)acrylate, most preferably the compound is 2-(2-vinyloxyethoxy)ethyl acrylate. 2-(2-vinyloxyethoxy)ethyl acrylate is available as VEEA from NIPPON SHOKUBAI.

Initiators

The curable inkjet fluid preferably contains an initiator. If no initiator is present, the curing may be accomplished by electron beam curing. The initiator typically initiates the polymerization reaction. The initiator can be a thermal initiator, but is preferably a photo-initiator. The photo-initiator requires less energy to activate than the monomers, oligomers and/or prepolymers to form the polymer. The photo-initiator suitable for use in the curable inkjet inks may be a Norrish type I initiator, a Norrish type II initiator or a photo-acid generator.

Thermal initiator(s) suitable for use in the curable inkjet ink include tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid and potassium persulfate.

The photo-initiator or photo-initiator system absorbs light and is responsible for the production of initiating species, such as free radicals and cations. Free radicals and cations are high-energy species that induce polymerization of monomers, oligomers and polymers and with polyfunctional monomers and oligomers thereby also inducing cross-linking.

Irradiation with actinic radiation may be realized in two steps by changing wavelength or intensity. In such cases it is preferred to use 2 types of photo-initiator together.

A combination of different types of initiator, for example, a photo-initiator and a thermal initiator can also be used.

A preferred Norrish type I-initiator is selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and α-halophenylglyoxalates.

A preferred Norrish type II-initiator is selected from the group consisting of benzophenones, thioxanthones, 1,2-diketones and anthraquinones. A preferred co-initiator is selected from the group consisting of an aliphatic amine, an aromatic amine and a thiol. Tertiary amines, heterocyclic thiols and 4-dialkylamino-benzoic acid are particularly preferred as co-initiator.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6-trimethylbenzoyldiphenylphosphine oxide, 2-methyl-1-[4-(methylthio)phenyl]-2-morpholinopropan-1-one, 2,2-dimethoxy-1,2-diphenylethan-1-one or 5,7-diiodo-3-butoxy-6-fluorone, diphenyliodonium fluoride and triphenylsulfonium hexafluophosphate.

Suitable commercial photo-initiators include IRGACURE™ 184, IRGACURE™ 500, IRGACURE™ 907, IRGACURE™ 369, IRGACURE™ 1700, IRGACURE™ 651, IRGACURE™ 819, IRGACURE™ 1000, IRGACURE™ 1300, IRGACURE™ 1870, DAROCUR™ 1173, DAROCUR™ 2959, DAROCUR™ 4265 and DAROCUR™ ITX available from CIBA SPECIALTY CHEMICALS, Lucerin TPO available from BASF AG, ESACURE™ KT046, ESACURE™ KIP150, ESACURE™ KT37 and ESACURE™ EDB available from LAMBERTI, H-NU™ 470 and H-NU™ 470X available from SPECTRA GROUP Ltd.

Suitable cationic photo-initiators include compounds, which form aprotic acids or Bronstead acids upon exposure to ultraviolet and/or visible light sufficient to initiate polymerization. The photo-initiator used may be a single compound, a mixture of two or more active compounds, or a combination of two or more different compounds, i.e., co-initiators. Non-limiting examples of suitable cationic photo-initiators are aryldiazonium salts, diaryliodonium salts, triarylsulphonium salts, triarylselenonium salts and the like.

The curable inkjet ink may contain a photo-initiator system containing one or more photo-initiators and one or more sensitizers that transfer energy to the photo-initiator(s). Suitable sensitizers include photoreducible xanthene, fluorene, benzoxanthene, benzothioxanthene, thiazine, oxazine, coumarin, pyronine, porphyrin, acridine, azo, diazo, cyanine, merocyanine, diarylmethyl, triarylmethyl, anthraquinone, phenylenediamine, benzimidazole, fluorochrome, quinoline, tetrazole, naphthol, benzidine, rhodamine, indigo and/or indanthrene dyes. The amount of the sensitizer is in general from 0.01 to 15 wt %, preferably from 0.05 to 5 wt %, based in each case on the total weight of the curable inkjet ink.

In order to increase the photosensitivity further, the curable inkjet ink may additionally contain co-initiators. For example, the combination of titanocenes and trichloromethyl-s-triazines, of titanocenes and ketoxime ethers and of acridines and trichloromethyl-s-triazines is known. A further increase in sensitivity can be achieved by adding dibenzalacetone or amino acid derivatives. The amount of co-initiator or co-initiators is in general from 0.01 to 20 wt %, preferably from 0.05 to 10 wt %, based in each case on the total weight of the curable inkjet ink.

Suitable examples of co-initiators can be categorized in 4 groups:
(1) tertiary aliphatic amines such as methyldiethanolamine, dimethylethanolamine, triethanolamine, triethylamine and N-methylmorpholine;
(2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino)benzoate;
(3) (meth)acrylated amines such as dialkylamino alkyl(meth)acrylates (e.g., diethylaminoethylacrylate) or N-morpholinoalkyl-(meth)acrylates (e.g., N-morpholinoethyl-acrylate); and
(4) amides or ureas.

The preferred co-initiators are aminobenzoates.

A preferred amount of initiator is 0.3-50 wt % of the total weight of the curable liquid, and more preferably 1-15 wt % of the total weight of the curable inkjet ink.

Inhibitors

Suitable polymerization inhibitors include phenothiazine, phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used. Of these, a phenol compound having a double bond in molecules derived from acrylic acid is particularly preferred due to its having a polymerization-restraining effect even when heated in a closed, oxygen-free environment. Suitable inhibitors are, for example, SUMILIZER™ GA-80, SUMILIZER™ GM and SUMILIZER™ GS produced by Sumitomo Chemical Co., Ltd, Ciba IRGASTAB™ UV10 from CIBA Specialty Products and GENORAD™ 16 available from RAHN.

Since excessive addition of these polymerization inhibitors will lower the sensitivity to curing, it is preferred that the amount capable of preventing polymerization be determined prior to blending. The amount of a polymerization inhibitor is generally between 200 and 20,000 ppm of the total weight of the curable inkjet ink.

Surfactants

The surfactant(s) can be anionic, cationic, non-ionic, or zwitter-ionic and are usually added in a total quantity less than 20 wt % based on the total weight of the inkjet ink and particularly in a total less than 10 wt % based on the total weight of the inkjet ink.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

For non-aqueous inkjet inks preferred surfactants are selected from fluoro surfactants (such as fluorinated hydrocarbons) and silicone surfactants. The silicones are typically siloxanes and can be alkoxylated, polyether modified, polyether modified hydroxy functional, amine modified, epoxy modified and other modifications or combinations thereof. Preferred siloxanes are polymeric, for example polydimethylsiloxanes.

In a curable inkjet ink a fluorinated or silicone compound may be used as a surfactant, but preferably a cross-linkable surfactant is used. Polymerizable monomers having surface-active effects include silicone modified acrylates, silicone modified methacrylates, acrylated siloxanes, polyether modified acrylic modified siloxanes, fluorinated acrylates, and fluorinated methacrylates. Polymerizable monomers having surface-active effects can be mono-, di-, tri- or higher functional (meth)acrylates or mixtures thereof.

Binders

The inkjet fluids may include a binder resin. The binder functions as a viscosity controlling agent and also provides fixability relative to the polymeric resin support, e.g., a polyvinyl chloride support, also called vinyl support. The binder must be selected to have a good solubility in the solvent(s).

Suitable examples of binder resins include acrylic resins, modified acrylic resins, styrene acrylic resins, acrylic copolymers, acrylate resins, aldehyde resins, rosins, rosin esters, modified rosins and modified rosin resins, acetyl polymers, acetal resins such as polyvinyl butyral, ketone resins, phenolic resins and modified phenolic resins, maleic resins and modified maleic resins, terpene resins, polyester resins, polyamide resins, polyurethane resins, epoxy resins, vinyl resins, vinyl chloride-vinyl acetate copolymer resins, cellulose type resins such as nitro cellulose, cellulose acetopropionate and cellulose acetate butyrate, and vinyl toluene-α-methylstyrene copolymer resin. These binders may be used alone or in a mixture thereof. The binder is preferably a film-forming thermoplastic resin.

The amount of binder resin in inkjet ink is preferably in the range of 0.1 to 30 wt %, more preferably 1 to 20 wt %, most preferably 2 to 10 wt % based on the total weight of the inkjet ink.

Other Additives

The inkjet inks may include other additives such as buffering agents, anti-mold agents, pH adjustment agents, electric conductivity adjustment agents, chelating agents, anti-rusting agents, light stabilizers, dendrimers, polymers, cross-linking agents, soluble electrolytes as conductivity aid, sequestering agents and chelating agents, compounds to introduce additional security features and the like. Such additives may be included in the inkjet inks in any effective amount, as desired.

Preparation of Pigmented Inkjet Inks

The pigmented inkjet inks can be prepared by precipitating or milling the pigment in the dispersion medium in the presence of the polymeric dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can include particles, preferably substantially spherical in shape, e.g., beads consisting essentially of a polymeric resin or yttrium stabilized zirconium oxide beads.

In the process of mixing, milling and dispersion, each process is performed with cooling to prevent build up of heat, and for radiation curable inkjet inks as much as possible under light conditions in which actinic radiation has been substantially excluded.

The inkjet ink may contain more than one pigment, the inkjet ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture include the mill grind and the milling media.

The mill grind includes pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, mechanical means and residence conditions selected, the initial and desired final particle size, etc. In a preferred embodiment of the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g., for a bead mill. The milled pigment concentrate is preferably separated from the milling media by filtration.

In general it is desirable to make the inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

EXAMPLES

Materials

All materials used in the following examples were readily available from standard sources such as Aldrich Chemical Co. (Belgium) and Acros (Belgium) unless otherwise specified.

TR52 is TIOXIDE TR52 ™, a surface modified titanium dioxide from HUNTSMAN CHEMICAL GROUP.

PDISP is an abbreviation used for the polymeric dispersant EFKA™ 4046 from EFKA Additives BV, The Netherlands whereof the solvent mixture of butylacetate, 2-methoxy-1-methylacetate and sec-butanol was removed.

GENORAD™ 16 is a polymerization inhibitor from RAHN AG.

IBOA is isobornylacrylate available as SR506D from SARTOMER.

EBECRYL™ 11 is a polyethyleneglycoldiacrylate available from CYTEC SURFACE SPECIALTIES.

SANTICIZER™ 278 is benzyl-2-isobutyloxy-1-isopropyl-2,2-dimethylpropul phthalate available from FERRO (Belgium) S.p.r.l.

IRGACURE™ 819 is phenylbis(2,4,6-trimethylbenzoyl)-phosphine oxide available from CIBA SPECIALTY CHEMICALS.

CD9021 is a highly propoxylated glyceryl triacrylate from SARTOMER.

GENOMER™ 1122 is a monofunctional aliphatic urethane acrylate from RAHN AG.

Subbed clear PET is a 100 μm thick polyester film provided with a 0.2 μm thick subbing layer, containing silica particles and co(vinilidenechloride-methacrylate-itacinic acid 88/10/2) and an antistatic backlayer available as Type N°198 Polyester Base Film from AGFA-GEVAERT N.V.

Measurement Methods

1. Average Particle Size of Pigment Dispersion

The average particle size of pigment particles in pigment dispersions was determined by photon correlation spectroscopy at a wavelength of 633 nm with a 4 mW HeNe laser on a diluted sample of the pigment dispersion. The particle size analyzer was a MALVERN™ nano-S available from Goffin-Meyvis.

The sample was prepared by addition of one drop of ink to a cuvet containing 1.5 mL ethyl acetate and mixed until a homogenous sample was obtained. The measured particle size is the average value of 3 consecutive measurements consisting of 6 runs of 20 seconds.

2. Curing Degree

The curing degree is tested on a coating immediately after curing with UV light. The cured coating is rubbed with the means of a Qtip. When the surface is not damaged, the coating is fully cured. When some of the surface can be damaged, the coating is only partly cured. When the surface is completely damaged, the coating is not cured.

3. Measurement of Reflection Density

Density measurements were carried out with a MacBeth RD918SB reflection densitometer (blue fliter setting) using a black film as a non-reflective background.

4. Measurement of Hardness

Hardness is the ability to resist indentation. Hardness of the cured inks and ink coatings was measured according to ASTM D-2240-05, which is based on the penetration of a specific type of indentor when forced into the material under specified conditions. The indentation hardness is inversely related to the penetration and is dependent on the elastic modulus and viscoelastic behaviour of the material. The geometry of the indentor and the applied force are chosen in relation with the kind of material.

The measurement of the hardness for the cured ink and ink coatings was done using a Shore A durometer operating stand. The shore A scale is used for soft rubbery materials (e.g., a standard auto tire tread has a Shore hardness between 55 and 70 Shore A).

The sample was prepared by filling a petri dish, having a diameter of 5.6 cm with 10 g of an ink, which resulted in a circular sample with a height of approximately 4 mm after curing.

5. Measurement of Elongation at Break

Elongation at break is the percentage of elongation at the moment of rupture of the test sample. Percentage elongation at break was measured using an Instron Universal Tensile Testing Machine, Model 4469. Samples were stretched with an elongation speed of 10 mm/min at 22° C.

Sample preparation: a coating of the ink was made using a bar coater to deliver a coating with a thickness of approximately 0.5 mm on LUMIRROR™ X43 from TORAY as a temporary support. The coatings were cured. After curing, the cured layer was peeled off from the temporary support. Then T-bone shaped samples were cutted out and the elongation at break was measured with the Instron machine.

6. Measurement of Creep Recovery

Creep recovery reflects the resistance of a material to deform permanently to relieve stresses. To determine creep properties, a sample is subjected to prolonged constant tension or compression at constant temperature. Deformation is recorded at specified time intervals and a creep vs. time diagram is plotted. The slope of the curve at any point is the creep rate. If the specimen does not fracture within the test period, the creep recovery can be measured.

Creep recovery is the rate of decrease in deformation that occurs when the tension or compression is removed after prolonged application in a creep test. Constant temperature is maintained to eliminate effects of thermal expansion.

For the purpose of this invention, the creep recovery is determined in a static compression test. A sample with a length of 6.2 mm, prepared as described for elongation at break measurements, is deformed with a ball point probe (2.7 mm) during 5 minutes with a set pressure of 0.005 MPa. After release of the pressure, the creep recovery is determined after 1.2 s, 15 s en 10 min.

A suitable standard creep testing procedure is also detailed in ASTM D-2990.

Example 1

This example illustrates how the hardness of the cured layer can be varied by using mixtures of two inkjet fluids differing in composition, both fluids having different hardnesses after being cured.

Preparation of Inkjet Fluids

Fluid 1 and Fluid 2 were radiation curable inkjet fluids prepared by mixing the components under stirring at 20° C. to obtain a composition as shown in Table 1.

TABLE 1

| wt % of: | Fluid 1 | Fluid 2 |
|---|---|---|
| IBOA | 23.63 | 30.00 |
| EBECRYL ™ 11 | 23.83 | — |
| CD9021 | — | 30.00 |
| GENOMER ™ 1122 | 34.41 | 22.50 |
| SANTICIZER ™ 278 | 12.95 | 12.50 |
| IRGACURE ™ 819 | 5.18 | 5.00 |

Preparation of Mixtures of Fluid 1 and Fluid 2

Mixtures of Fluid 1 and Fluid 2 were prepared according to Table 2. The percentages are weight percentages based upon the total weight of the mixture.

TABLE 2

| mixture | Fluid 1 | Fluid 2 |
|---|---|---|
| MIX-1 | 0% | 100% |
| MIX-2 | 25% | 75% |
| MIX-3 | 50% | 50% |
| MIX-4 | 75% | 25% |
| MIX-5 | 100% | 0% |

Evaluation

The mixtures MIX-1 to MIX-5 were each coated on a subbed clear PET film using a bar coater and a 10 μm wired bar.

Curing of the samples was performed under a nitrogen inerting condition. The sample was placed under a metal frame of 1 cm height covered with a non UV-absorbing quartz glass window, so that a sealed chamber was formed. Then, the trapped air in the chamber was replaced by nitrogen gas by introducing pure nitrogen gas into the chamber for 30 seconds.

The curing of the mixtures was performed in a two step curing. In the first step, the coating was irradiated during with a UV-A Light box equipped with 8 Philips TL 20W:10 UVA ($\lambda_{max}$=370 nm) at 10 cm above the coating surfaces. The front side was cured during ten minutes, then the sample was turned, and the back side was cured for 10 minutes. In the second step, the coatings (front side) were cured further by irradiation during 20 minutes with a similar lightbox but equipped with 4 Philips TUV lamps ($\lambda_{max}$=254 nm).

All coatings were found to be fully cured.

The hardness values for the cured mixtures are given in Table 3.

TABLE 3

| mixture | Hardness Shore A |
|---|---|
| MIX-1 | 76 |
| MIX-2 | 73 |
| MIX-3 | 70 |
| MIX-4 | 66 |
| MIX-5 | 56 |

The cured samples of the mixtures of Fluid 1 and Fluid 2 resulting in MIX-1 to MIX-5 exhibited a different hardness in a wide range suitable for printing on different supports used in flexography.

Instead of having the same hardness over the whole thickness of the flexographic printing form, the capability of varying the hardness by varying the ratio of Fluid 1 and Fluid 2 in the ink jet printing unit can also be used to obtain hard top layers and soft bottom layers.

Example 2

This example illustrates how the flexibility of the cured layer can be varied by the use of mixtures of two inkjet fluids differing in composition.

Preparation of Inkjet Fluids

Fluid 3 and Fluid 4 were radiation curable inkjet fluids prepared by mixing the components under stirring at 20° C. to obtain a composition as shown in Table 4.

TABLE 4

| wt % of: | Fluid 3 | Fluid 4 |
|---|---|---|
| IBOA | 30.00 | 60.10 |
| EBECRYL ™ 11 | 30.00 | 21.38 |
| GENOMER ™ 1122 | 22.50 | — |
| SANTICIZER ™ 278 | 12.50 | 13.23 |
| IRGACURE ™ 819 | 5.00 | 5.29 |

Preparation of Mixtures of Fluid 3 and Fluid 4

Mixtures of the Fluid 3 and Fluid 4 were prepared according to Table ~5. The percentages are weight percentages based upon the total weight of the mixture.

TABLE 5

| mixture | Fluid 3 | Fluid 4 |
|---|---|---|
| MIX-6 | 0% | 100% |
| MIX-7 | 25% | 75% |
| MIX-8 | 50% | 50% |
| MIX-9 | 75% | 25% |
| MIX-10 | 100% | 0% |

Evaluation

The mixtures MIX-6 to MIX-10 were each coated on a subbed clear PET film using a bar coater and a 10 μm wired bar.

Curing of the coated samples was performed under a nitrogen inerting condition. The coated sample was placed under a metal frame of 1 cm height covered with a non UV-absorbing quartz glass window, so that a sealed chamber was formed.

Then, the trapped air in the chamber was replaced by nitrogen gas by introducing pure nitrogen gas into the chamber for 30 seconds.

The curing of the mixtures was performed in a two step curing. In the first step, the coating was irradiated during three minutes with a UV-A Light box equipped with 8 Philips TL 20W:10 UVA ($\lambda_{max}$=370 nm) at 10 cm above the coating surfaces. In the second step, the coatings were cured further by irradiation during 20 minutes with a similar lightbox but equipped with 4 Philips TUV lamps ($\lambda_{max}$=254 nm).

All coatings were found to be fully cured.

The elongation at break values for the cured mixtures are given by Table 6.

TABLE 6

| mixture | Elongation at break |
| --- | --- |
| MIX-6 | 102% |
| MIX-7 | 48% |
| MIX-8 | 14% |
| MIX-9 | 0% |
| MIX-10 | 0% |

From Table 6, it is clear that flexibility defined by the elongation at break can be varied over a wide range by selecting an appropriate mixture of inkjet fluids Fluid 3 and Fluid 4. By mixing these inkjet fluids in or just before entering the print head the elongation at break can be varied, optionally also at different areas of the 3D-object.

Example 3

This example illustrates how the visibility of a 3D-relief image can be improved by the use of an opaque fluid and a clear fluid.

Preparation of Fluids

Fluid 5 was a concentrated pigment dispersion of $TiO_2$ in a dispersion medium constituted of a low viscous monofunctional polymerizable compound. Fluid 5 was prepared according to Table 7.

TABLE 7

| wt % of: | Fluid 5 |
| --- | --- |
| TR52 | 50.0 |
| PDISP | 10.0 |
| GENORAD ™ 16 | 1.0 |
| IBOA | 39.0 |

Fluid 5 was made by mixing 500.0 g of the white pigment TR52, 10.0 g of the inhibitor GENORAD™ 16, 333.3 g of a 30% solution of PDISP in IBOA, and 156.7 g IBOA using a DISPERLUX™ Laboratory Dissolver YELLOW075 from DISPERLUX S.A.R.L., Luxembourg. This mixture was subsequently milled in an Eiger Lab bead mill (from EIGER TORRANCE Ltd.) using yttrium-stabilized zirconium oxide-beads of 1-1.6 mm diameter ("high wear resistant zirconia grinding media" from TOSOH Co.) The bead mill was filled for 52% with the grinding beads and water-cooled during milling at 3000 rpm for 5 minutes. The concentrated pigment dispersion Fluid 5 had an average particle size of 365 nm measured with a MALVERN™ nano-S particle size analyzer.

Fluid 6 was a radiation curable composition prepared by mixing the components under stirring at 20° C. to obtain a composition as shown in Table 8.

TABLE 8

| wt % of: | Fluid 6 |
| --- | --- |
| IBOA | 53.66 |
| EBECRYL ™ 11 | 28.84 |
| SANTICIZER ™ 278 | 12.50 |
| IRGACURE ™ 819 | 5.00 |

Preparation of Mixtures of Fluid 5 and Fluid 6

Mixtures of the inkjet fluids Fluid 5 and Fluid 6 were prepared according to Table 9. The percentages are weight percentages based upon the total weight of the mixture.

TABLE 9

| mixture | Fluid 5 | Fluid 6 |
| --- | --- | --- |
| MIX-11 | 0% | 100% |
| MIX-12 | 3.75% | 96.25% |
| MIX-13 | 6.25% | 93.75% |
| MIX-14 | 8.75% | 91.25% |
| MIX-15 | 12.50% | 87.50% |
| MIX-16 | 18.75% | 81.25% |

Coating and Curing of Mixtures of Fluid 5 and Fluid 6

The mixtures MIX-11 to MIX-16 were each coated on a subbed clear PET film using a bar coater and a 10 µm wired bar.

Curing of the coated samples was performed under a nitrogen inerting condition. The coated sample was mounted on a metal plate and on top of the plate a metal frame of 1 cm height covered with a non UV-absorbing quartz glass window, so that a sealed chamber was formed with the coated sample inside. Then, the trapped air in the chamber was replaced by nitrogen gas by introducing pure nitrogen gas into the chamber for 30 seconds.

The curing of the coatings was performed in a two step curing. In the first step, the coating was irradiated during two minutes with a UV-A Light box equipped with 8 Philips TL 20W:10 UVA ($\lambda_{max}$=370 nm) at 10 cm above the coating surfaces. In the second step, the coatings were cured further by irradiation during 20 minutes with a similar lightbox but equipped with 4 Philips TUV lamps ($\lambda_{max}$=254 nm).

All coatings were found to be fully cured.

Evaluation

The reflection densities for the layers of the mixtures coatings are given in Table 10.

TABLE 10

| mixture | reflection density |
| --- | --- |
| MIX-11 | 2.01 |
| MIX-12 | 0.71 |
| MIX-13 | 0.59 |
| MIX-14 | 0.47 |
| MIX-15 | 0.41 |
| MIX-16 | 0.37 |

Varying the ratio of Fluid 5 and Fluid 6 in the mixtures resulted in a different opacity. This feature can be used for varying the opacity of different layers of a 3D-relief image in inkjet printing. It is e.g., possible to vary the amount of Fluid 5 in the mixture to raise the opacity of the top layers of a flexo printing plate, compared to the bottom layers. The result is an increased contrast on the flexographic form.

The use of coloured inkjet inks also allows easy identification of which flexographic form corresponds with which printing ink in multicolour flexography.

Furthermore, the concentrated pigment dispersion Fluid is very stable against settling of the $TiO_2$ particles compared to a ready-to-use ink, i.e., a dilution of Fluid 5.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A 3D-inkjet printing method comprising the steps of:
   a) providing two or more UV curable fluids having different compositions to an inkjet printer;
   b) mixing the two or more UV curable fluids in a controlled amount;
   c) jetting a mixture of the two or more UV curable fluids with the inkjet printer onto a support;
   d) at least partially curing the jetted mixture by actinic radiation or electron beams; and
   e) repeating steps b) to d) in order to build a 3D-relief on the support.

2. The 3D-inkjet printing method according to claim 1, wherein the two or more UV curable fluids include a polymerizable compound, an amount of the polymerizable compound in a first of the two or more UV curable fluids differs from an amount of the polymerizable compound in a second of the two or more UV curable fluids by at least 5 wt% based upon the total weight of the respective UV curable fluids.

3. The 3D-inkjet printing method according to claim 1, further comprising the step of:
   changing a composition of the mixture produced in step b) at least once in step e).

4. The 3D-inkjet printing method according to claim 1, wherein the two or more UV curable fluids are inkjet fluids.

5. The 3D-inkjet printing method according to claim 1, wherein the jetted mixture in step d) is partially cured and the steps b) to d) in step e) are repeated at least 100 times.

6. The 3D-inkjet printing method according to claim 1, wherein the mixing of the two or more UV curable fluids is controlled by a computer using a digital library of ink mixing data.

7. A printed 3D-object obtained by the 3D-inkjet printing method according to claim 1, wherein the printed 3D-object is a flexographic printing form.

8. The flexographic printing form according to claim 7, wherein the support is a flexographic sleeve.

9. The flexographic printing form according to claim 7, wherein two different surface areas of the flexographic printing form have a hardness differing by at least 5° Shore A as measured according to ASTM D-2240-05.

10. An inkjet fluid set for use in the method of 3D printing according to claim 1, the inkjet fluid set comprising:
    the two or more UV curable inkjet fluids each containing a polyfunctional polmerizable compound; wherein
    an amount of the polyfunctional polymerizable compound in a first of the two or more UV curable inkjet fluids differs from an amount of the polyfunctional polmerizable compound in a second of the two or more UV curable inkjet fluids by at least 10 wt% based upon the total weight of a polymerizable composition of the respective UV curable inkjet fluids.

11. The inkjet fluid set according to claim 10, wherein at least one of the two or more UV curable inkjet fluids includes at least 30 wt% of a monofunctional monomer based upon the total weight of the polymerizable composition of the at least one UV curable inkjet fluid.

12. The inkjet fluid set according to claim 10, wherein at least one of the two or more UV curable inkjet fluids includes at least 20 wt%, based upon the total weight of the polymerizable composition the at least one UV curable inkjet fluid, the polyfunctional polymerizable compound selected from the group consisting of bisphenol A epoxyacrylate, epoxy soya bean oil acrylate, fatty acid modified bisphenol A epoxy acrylate, monofunctional aliphatic urethane acrylate, 2-(2-ethoxyethoxy)ethyl acrylate, ethoxylated nonyl phenol acrylate, lauryl acrylate, isobornylacrylate, isodecyl acrylate, 2-phenoxyethyl acrylate, tetra hydrofurfuryl acrylate, polyethylene glycol diacrylate, ethoxylated neopentylglycol diacrylate, propoxylated neopentylglycol diacrylate, tetraethylene glycol diacrylate, tripropylene glycol diacrylate, 2-(2-vinyloxyethoxy)ethyl acrylate, and hexanediol diacrylate.

13. The inkjet fluid set according to claim 11, wherein at least one of the polyfunctional polymerizable compounds is selected from the group consisting of trifunctional (meth) acrylates, tetrafunctional (meth)acrylates, pentafunctional (meth)acrylates, and hexafunctional (meth)acrylates.

14. An inkjet printer for use in performing the method of 3D printing according to claim 1, the inkjet printer comprising:
    a) a rotating drum arranged to hold a flexographic support;
    b) a mixer arranged to mix the two or more fluids having different compositions; and
    c) a moving device arranged to move a print head during printing in both a horizontal direction and a vertical direction.

15. An ink jet printer comprising:
    an inkjet fluid set as defined by claim 10; wherein
    the inkjet fluid set is used to prepare mixtures exhibiting a different hardness, creep recovery and/or elongation at break for preparing a flexographic printing form.

16. The 3D-inkjet printing method according to claim 1, wherein each of the two or more UV curable fluids are individually curable by actinic radiation or electron beams.

* * * * *